United States Patent
Hinze et al.

[11] Patent Number: 5,846,284
[45] Date of Patent: *Dec. 8, 1998

[54] SPINNER WITH EYELETS HAVING MULTIPLE ORIFICES

[75] Inventors: Jay W. Hinze; Patrick M. Gavin, both of Newark, Ohio

[73] Assignee: Owens Corning Fiberglas Technology, Inc., Summit, Ill.

[*] Notice: This patent issued on a continued prosecution application filed under 37 CFR 1.53(d), and is subject to the twenty year patent term provisions of 35 U.S.C. 154(a)(2).

[21] Appl. No.: 690,616

[22] Filed: Jul. 31, 1996

[51] Int. Cl.$^6$ .................................................. C03B 37/04
[52] U.S. Cl. .................. 65/492; 65/493; 65/495; 65/521
[58] Field of Search ................ 65/493, 495, 521, 65/496, 497, 470; D7/591

[56] References Cited

U.S. PATENT DOCUMENTS

| | | | |
|---|---|---|---|
| D. 78,740 | 6/1929 | Flauder | D7/591 |
| 2,931,062 | 4/1960 | Leaman . | |
| 2,996,758 | 8/1961 | McFadden . | |
| 3,031,717 | 3/1962 | Leveque et al. . | |
| 3,259,479 | 7/1966 | Tiede | 65/495 |
| 3,278,282 | 10/1966 | Jaray . | |
| 3,591,362 | 7/1971 | Benjamin . | |
| 3,738,817 | 6/1973 | Benjamin . | |
| 3,814,935 | 6/1974 | Cometto et al. . | |
| 4,140,507 | 2/1979 | Costin | 65/493 |
| 4,343,636 | 8/1982 | Bhatti | 65/495 |
| 4,348,216 | 9/1982 | Bhatti et al. . | |
| 4,402,718 | 9/1983 | Bhatti . | |
| 4,402,719 | 9/1983 | Bhatti . | |
| 4,402,767 | 9/1983 | Hinze et al. . | |
| 4,404,009 | 9/1983 | Bhatti et al. . | |
| 4,427,428 | 1/1984 | Bhatti | 65/493 |
| 4,430,105 | 2/1984 | Bhatti et al. . | |
| 4,433,991 | 2/1984 | Melan | 65/495 |
| 4,437,869 | 3/1984 | Lecron | 65/495 |
| 4,620,859 | 11/1986 | Lin | 65/521 |
| 4,877,435 | 10/1989 | Haeberle, Jr. et al. . | |
| 4,995,892 | 2/1991 | Garrett | 65/199 |
| 5,312,469 | 5/1994 | Houston . | |
| 5,417,735 | 5/1995 | McGarry . | |
| 5,462,571 | 10/1995 | Taguchi | 65/495 |
| 5,482,527 | 1/1996 | Czastkiewicz | 65/521 |
| 5,595,766 | 1/1997 | Houpt | 425/8 |
| 5,619,328 | 4/1997 | Lin | 65/502 |
| 5,674,307 | 10/1997 | Huey | 65/521 |

FOREIGN PATENT DOCUMENTS

| | | | |
|---|---|---|---|
| 618888 | 4/1961 | Canada | 65/495 |

OTHER PUBLICATIONS

"Metals Handbook® Ninth Edition vol. 14 Forming and Forging" by S.L. Semiatin, Apr. 1988 Declaration of Jay W. Hinze.

*Primary Examiner*—John Hoffmann
*Attorney, Agent, or Firm*—C. Michael Gegenheimer; Curtis B. Brueske

[57] ABSTRACT

A spinner for centrifuging mineral fibers from molten mineral material is disclosed. The spinner includes a generally annular peripheral wall, the peripheral wall having a plurality of apertures formed therethrough, and a plurality of eyelets mounted in the apertures, each eyelet having multiple orifices formed therethrough.

17 Claims, 4 Drawing Sheets

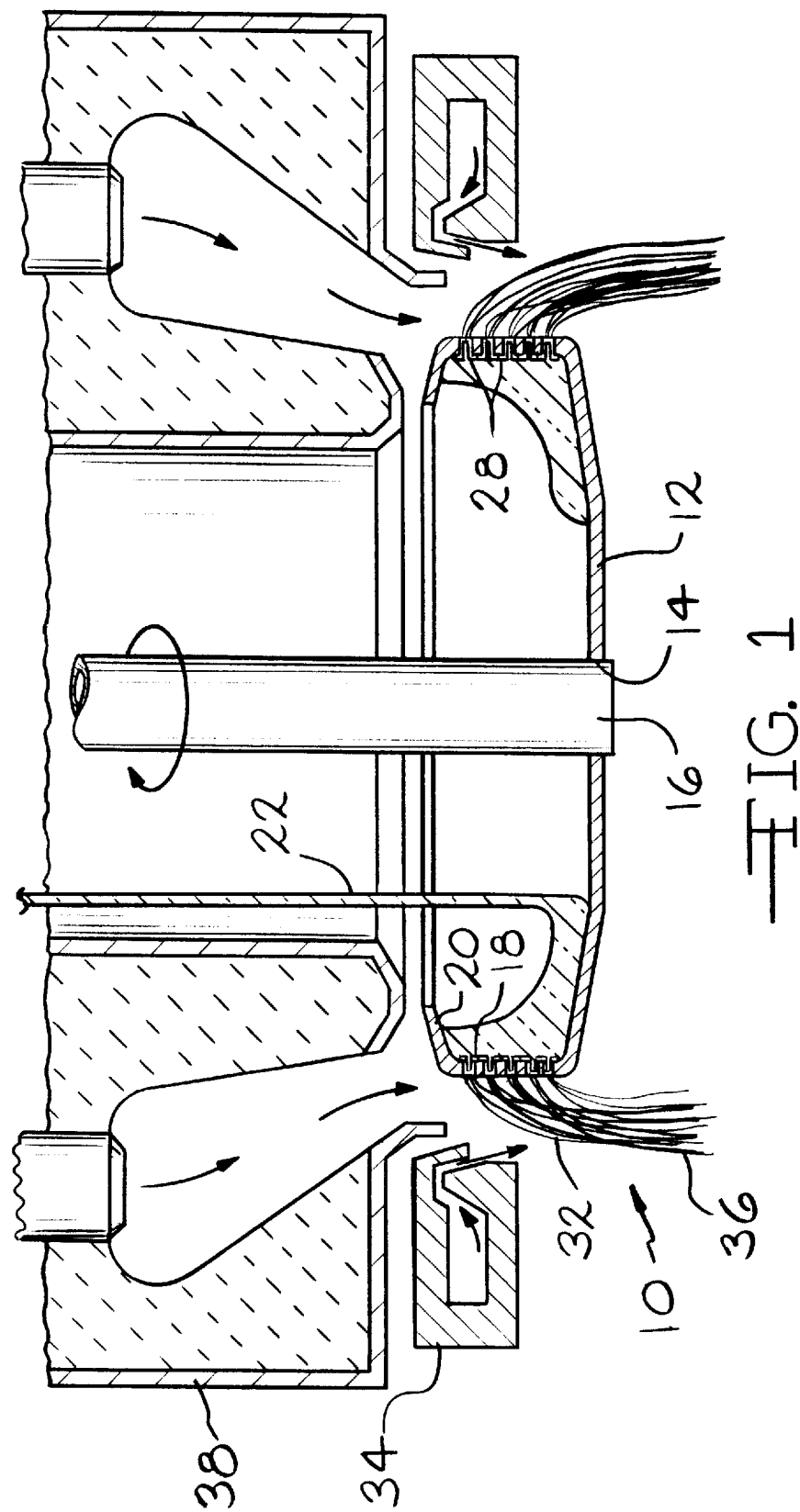

5,846,284

SPINNER WITH EYELETS HAVING MULTIPLE ORIFICES

SPECIFICATION

To all whom it may concern:

Be it known that We, JAY W. HINZE and PATRICK M. GAVIN, both residents of Newark, County of Licking, State of Ohio, and citizens of the United States, have invented a new and useful improvement in a SPINNER WITH EYELETS HAVING MULTIPLE ORIFICES which invention is fully set forth in the following specification.

1. Technical Field

This invention relates in general to a spinner for making mineral fibers such as glass fibers by a rotary process. More specifically, this invention relates to a spinner having a plurality of corrosion-resistant eyelets in the peripheral wall, with each eyelet having multiple fiber-forming orifices.

2. Background of the Invention

The production of mineral fibers such as glass fibers by a rotary process is well known. In this process, molten mineral material is fed at a high temperature into a metallic spinner which revolves at a high rotation rate. When producing glass fibers, the spinner is usually operated at a temperature of about 925°–1,200° C. and a rotation rate of about 2,000–3,000 RPM. The spinner has a peripheral wall containing a multiplicity of orifices. The molten glass flows by centrifugal force through the orifices and forms small diameter molten glass streams. The streams are directed downward by a blower toward a collection surface, become attenuated, and cool to form fibers.

Over a period of time, the flow of molten glass at high temperature through the orifices can corrode the metal of the spinner around the orifices. Typical spinners are formed of a base metal alloy which is susceptible to such corrosion. The corrosion of the metal around the orifices causes the orifices to enlarge. As a result, the life of the spinner is limited by enlargement of the orifices. In addition, because the orifices corrode over time, the mean fiber diameter and the standard deviation of fiber diameter increase over time. This in turn wastes considerable glass to produce thermal resistance of the glass fiber product.

Various attempts have been made to provide a spinner having orifices that are resistant to corrosion by molten glass. However, these attempts have not been totally successful. For example, it is known to apply a coating of precious metal to the interior of the orifices of a spinner. Only a very thin coating can be applied, and the coating does not last very long. It is also known to use a precious metal insert in each of the multiplicity of orifices of the spinner, for example, as disclosed in U.S. Pat. No. 4,427,428. The manufacture of a spinner with such a large number of inserts can be time-consuming and expensive, and the operation of such a spinner is not totally satisfactory.

Further, it is known to use a dual-layered spinner wall with a high strength outer wall and a precious metal inner wall, for example, as disclosed in U.S. Pat. No. 3,031,717. The inner wall has a multiplicity of small, fiber-forming orifices aligned with larger bores in the outer wall. When the fiber-forming orifices are recessed in the spinner wall, it is difficult to achieve good attenuation of the molten glass streams by the blower. Also, the blower may force the streams against the sides of the bores, which can cause flooding and corrosion of the bores. Accordingly, it would be desirable to provide a good-performing, economical spinner that is relatively resistive of corrosion of the orifices by molten glass.

SUMMARY OF THE INVENTION

The above objects as well as other objects not specifically enumerated are accomplished by a spinner for centrifuging fibers from molten mineral material in accordance with the present invention. The spinner of the present invention includes a generally annular peripheral wall, the peripheral wall having a plurality of apertures formed therethrough, and a plurality of eyelets mounted in the apertures, each eyelet having multiple orifices formed therethrough.

The above objects are also accomplished by an eyelet for making mineral fibers in a rotary process, the eyelet comprising a body shaped generally as a hollow cylinder, including a generally cylindrical portion having an open end and a closed end, a flange extending radially outward from the open end of the cylindrical portion, and a generally circular eyelet face extending across the closed end of the cylindrical portion, wherein the eyelet face has from about 5 to about 500 orifices formed therethrough, and wherein the body is formed of a precious metal selected from the group consisting of platinum, rhodium palladium, ruthenium, iridium, osmium, silver, gold, and alloys thereof.

BRIEF DESCRIPTION OF DRAWINGS

FIG. 1 is a cross-sectional view in elevation of a spinner with precious metal eyelets having multiple orifices according to the present invention.

DETAILED DESCRIPTION

Figure 2:
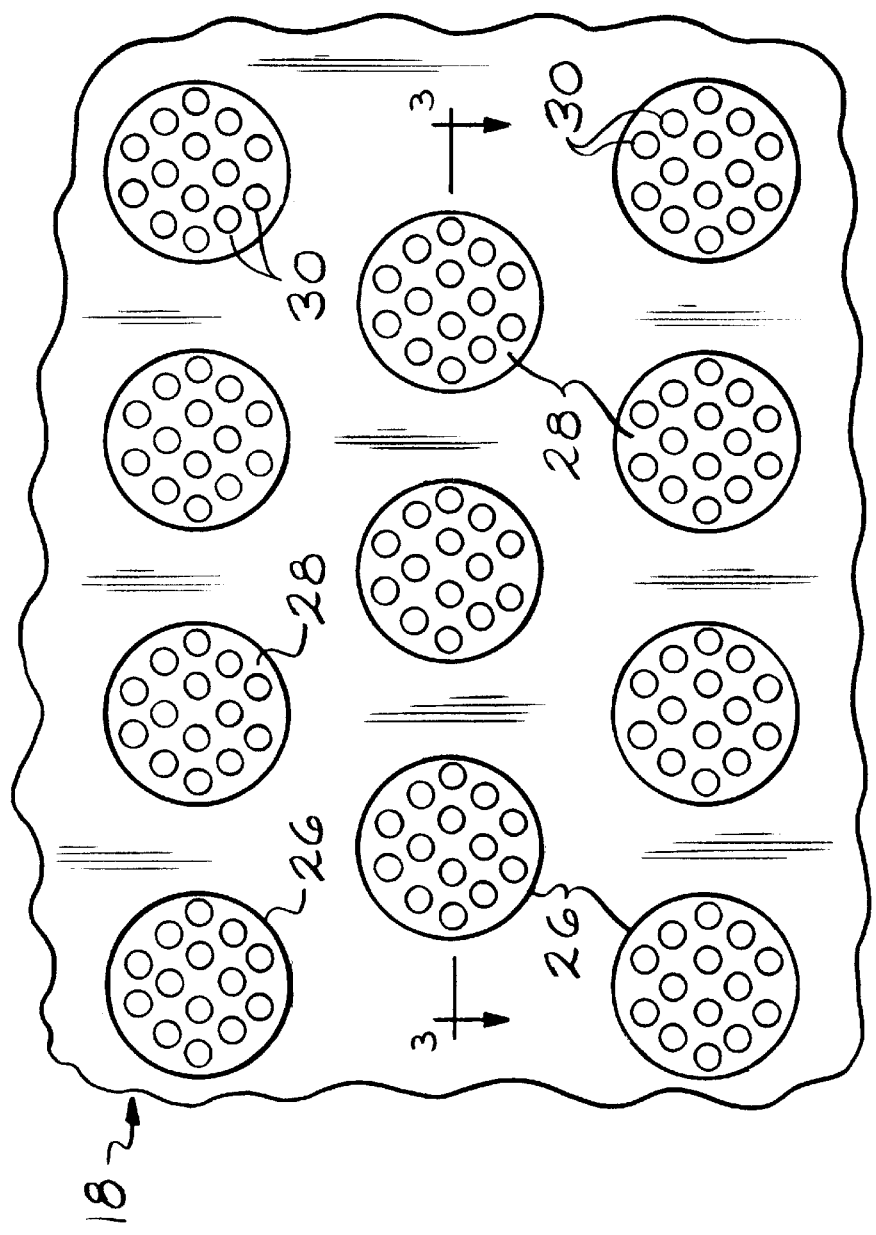
FIG. 2 is a side view of a portion of the peripheral wall of the spinner, showing in more detail the precious metal eyelets having multiple orifices.

Referring now to the drawings, FIGS. 1 and 2 illustrate a spinner 10 in accordance with the present invention for making glass fibers by a rotary process. The spinner is generally annular in shape. It includes a generally circular, horizontal bottom wall 12 having a circular opening 14 formed therethrough. The spinner is rotated by any suitable means, such as a spindle 16 secured inside the opening. A generally annular, vertical peripheral wall 18 is formed integrally with the bottom wall. A generally annular, horizontal upper flange 20 is formed integrally with the peripheral wall.

The interior of the spinner is supplied with a stream of molten glass 22 from any source, such as a furnace and forehearth (not shown). The molten glass flows by centrifugal force to the peripheral wall 18 of the spinner. Preferably, the peripheral wall is single-layered. As best seen in FIG. 2, the peripheral wall 18 has a plurality of apertures 26 formed therethrough. A plurality of precious metal eyelets 28 are mounted in the apertures. Each of the eyelets has multiple orifices 30 formed therethrough. The molten glass flows by centrifugal force through the orifices and forms small diameter molten glass streams 32.

As the molten glass streams 32 emerge from the spinner 10, annular blower 34 is positioned to direct the streams downwardly. The streams become attenuated and cool to form fibers 36. The fibers are collected by any means such as a conveyor (not shown) and can optionally undergo further processing. A heating means such as annular burner 38 can optionally be positioned outside the spinner to heat either the spinner or the fibers, to facilitate the fiber attenuation and maintain the temperature of the spinner at the level for optimum centrifugation of the glass. Preferably the interior of the spinner is also heated by any heating means (not shown) such as by blowing in hot air or other gas.

Figure 3:
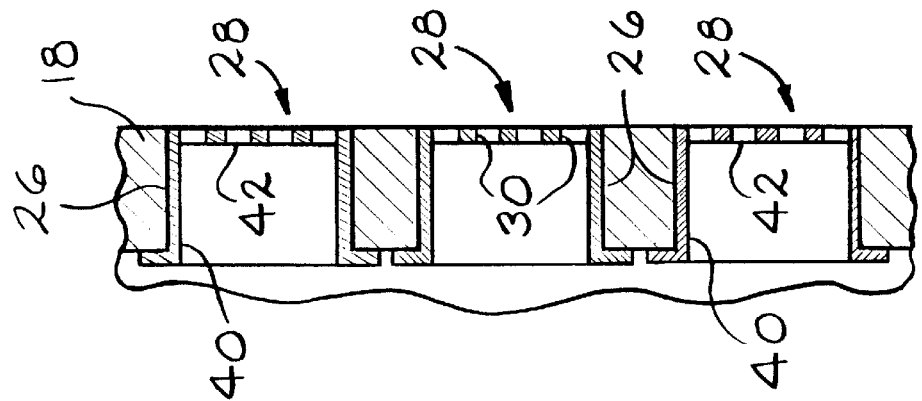
FIG. 3 is a cross-sectional view of the peripheral wall and eyelets, taken along line 3—3 of FIG. 2.
Figure 4:
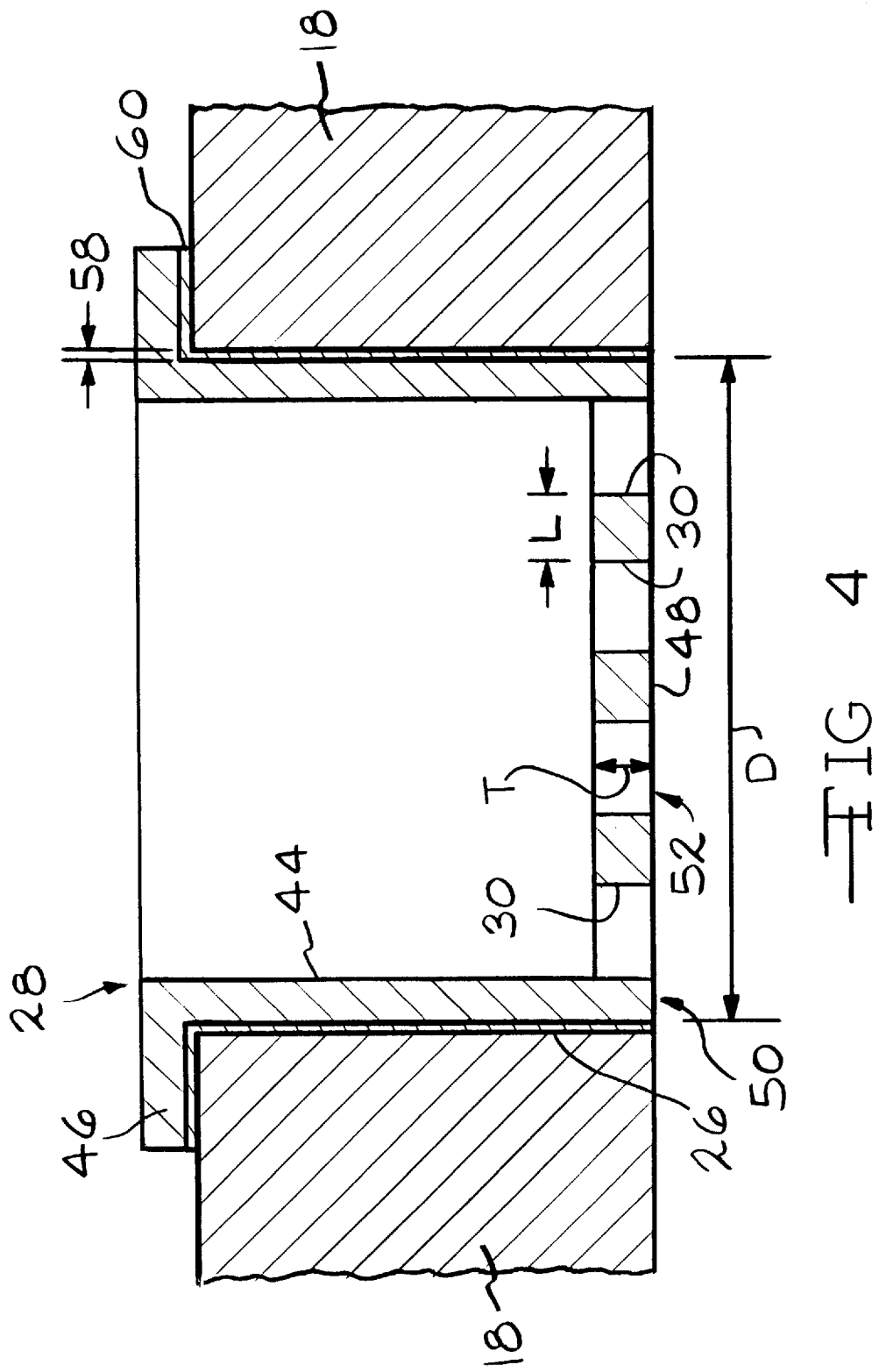
FIG. 4 is an enlarged cross-sectional view of one of the eyelets in the peripheral wall.

The eyelets 28 of the present invention are shown in more detail in FIGS. 2 through 4. The eyelets are mounted in the apertures 26 formed through the peripheral wall 18 of the spinner. The illustrated eyelet 28 is shaped generally as a hollow cylinder having an open end 40 and a closed end 42. Specifically, the eyelet includes a generally cylindrical portion 44 which is sized to fit within the aperture 26. A generally annular flange 46 extends radially outward from the cylindrical portion at the open end of the eyelet. The eyelet is mounted in the peripheral wall by journaling the eyelet into the aperture until the flange abuts the peripheral wall. The flange helps to hold the eyelet inside the aperture when the eyelet is subjected to molten glass pressure and centrifugal force by rotation of the spinner. Other means can also be used for mounting an eyelet in the peripheral wall, for example, by constructing the eyelet with a tapered cylindrical portion sized to fit within a tapered aperture in the peripheral wall.

The eyelet 28 further includes a generally circular eyelet face 48 at the closed end of the eyelet. The eyelet has a circumferential area 50 which is supported by the peripheral wall (including the cylindrical portion 44, the flange 46, and the portion of the eyelet face 48 adjacent to the peripheral wall). The eyelet face 48 also has a central area 52 which is unsupported by the peripheral wall 18. The central area of the eyelet face has multiple orifices 30 formed therethrough. Preferably, the eyelet face is flush with the peripheral wall, to ensure good attenuation of the molten glass streams after they flow through the orifices.

The eyelet face 48 is subjected to pressure from the molten glass during operation of the spinner. Consequently, the eyelet face is constructed to avoid excessive creep or rupture failure during operation. Preferably, the stress at the center of the eyelet face is maintained below a certain level, depending upon the type of precious metal used to form the eyelet. With very strong metals, the stress is preferably maintained below about 34.5 MPa (megapascals). With other metals, the stress is preferably maintained below about 20.7 MPa, more preferably below about 13.8 MPa, and most preferably below about 10.3 MPa. In a preferred embodiment of the invention, the stress is controlled by constructing the eyelet face with a diameter (D) to thickness (T) ratio of not greater than about 30:1. More preferably, the diameter to thickness ratio is not greater than about 20:1, and most preferably within the range from about 5:1 to about 17:1. In a particularly preferred embodiment, the diameter of the eyelet face is within the range from about 3.81 mm to about 6.35 mm, and the thickness of the eyelet face is within the range from about 0.25 mm to about 0.51 mm. (If the eyelet face is a shape other than circular, the eyelet face is constructed by adjusting the size and thickness of the face to maintain the stress at the center of the eyelet face below about 34.5 MPa.)

Preferably, the orifices are relatively equally spaced on the eyelet face to further maximize the strength of the eyelet face. The minimum amount of land (L) between the orifices (length of eyelet face between the orifices) depends on the size and number of the orifices. However, preferably the minimum amount of land is at least about 0.25 mm, and more preferably at least about 0.38 mm.

The eyelets of the present invention replace the multiplicity of orifices of a conventional spinner. In order to provide an equivalent number of orifices in the peripheral wall of the spinner, each eyelet contains multiple orifices in its eyelet face. For example, a conventional spinner having 25,000 orifices can be replaced by a spinner having 3,600 eyelets, each containing 7 orifices in its eyelet face. To show the flexibility of the present invention, only 1,800 eyelets would be required, each containing 14 orifices, to obtain the equivalent of 25,000 orifices in the spinner wall.

Figure 5:
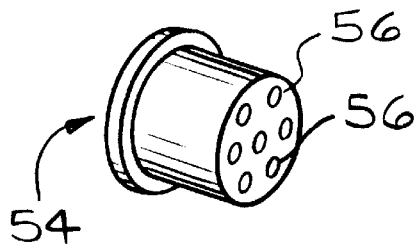
FIG. 5 is an enlarged perspective view of an alternate embodiment of an eyelet in accordance with the present invention.

The number of eyelets, size of the eyelets, number of orifices, and diameter of the orifices all can vary widely. Preferably, the spinner includes from about 1,000 to about 5,000 eyelets, and more preferably from about 1,500 to about 4,000 eyelets. It is envisioned that a very large number of very small orifices could be used in the eyelets. For example, the eyelets could include as many as 1,000 orifices or more, with the orifices having a diameter as small as 0.025 mm or less. Preferably, each eyelet has from about 5 to about 500 orifices, more preferably from about 5 to about 50 orifices, and most preferably from about 5 to about 20 orifices. The eyelet 28 shown in FIG. 2 includes 14 of the orifices 30. FIG. 5 illustrates an alternate embodiment of an eyelet 54 of the present invention having 7 of the orifices 56 formed therethrough. In another embodiment, the eyelet could include 19 orifices arranged in a symmetrical pattern. Preferably, the orifices are generally circular in cross section, and the diameter of the orifices is within the range from about 0.025 mm to about 0.76 mm, and more preferably from about 0.13 mm to about 0.51 mm.

The eyelets of the present invention are formed of a precious metal such as a material resistant to corrosion during centrifugation of mineral fibers, such as platinum, rhodium, palladium, ruthenium, iridium, osmium, silver, gold, or alloys thereof. Preferably, the eyelets are formed of a platinum-rhodium alloy such as alloys comprising, by weight, from about 75% to about 90% platinum and from about 10% to about 25% rhodium. In another preferred embodiment, the eyelets are formed of an oxide dispersion strengthened platinum or platinum alloy for excellent high temperature strength. Oxide dispersion strengthened metals are described below.

The spinner can be formed of any material known for use in making such spinners, for example, a nickel or cobalt based alloy. Preferably, however, the spinner is formed of a dispersion strengthened metal for increased strength at elevated temperatures. The dispersion strengthened metals contemplated for use in the present invention are well known in the art. These compositions include a dispersoid dispersed in a metal matrix. The dispersoid is selected from metal oxides, metal carbides, metal silicides, metal nitrides, metal borides, and mixtures thereof. Preferably, the dispersoid is a metal oxide, and most preferably the dispersoid is yttria or zirconia. The dispersoid is present in effective dispersion strengthening amounts. Usually, such amounts are within the range from about 0.1 percent to about 5.0 percent by volume of the dispersion strengthened metal.

The metal matrix of the dispersion strengthened metal may be any of a wide variety of compositions. The metal matrix is preferably an alloy, but it can also be a single metal. Examples of suitable metals for use in the metal matrix are nickel, chromium, cobalt and iron. Preferred matrices are nickel-chromium based alloys as well as nickel-chromium-cobalt based alloys. A particularly preferred dispersion strengthened metal is an alloy of about 70% nickel and about 30% chromium, by weight, with a dispersoid of yttria at a level of about 3% by volume of the metal. Suitable oxide dispersion strengthened metals are disclosed in U.S. Pat. Nos. 4,877,435, 4,402,767, 3,814,635, 3,738,817 and 3,591,362.

Preferably, the eyelets are mounted in the peripheral wall of the spinner by a brazing operation. As known to persons skilled in the art, brazing is a fusion joining process, specifically a method of uniting metals by means of a different metal (the brazing metal). The joints are made without pressure being applied, the brazing metal being introduced in the liquid state between the two pieces of metal to be joined and allowed to solidify. The brazing metal is distributed between the surfaces by capillary action. Brazing is similar to soldering, but differs in that higher temperatures are used to melt the brazing metal compared to a soldering metal.

During operation of the spinner, the precious metal of the eyelets and the metal of the spinner undergo different amounts of thermal expansion. This can result in loss of metal to metal contact, with leakage of molten glass around the eyelets and poor heat transfer between the metals. Brazing the eyelets in the peripheral wall reduces the chance of leakage of molten glass and helps to ensure good heat transfer during operation of the spinner. As shown in FIG. 4, a very thin gap 58 (slightly exaggerated in the drawing) exists between the eyelet 28 and the peripheral wall 18. The eyelet is joined to the peripheral wall by brazing so that the gap is filled with a brazing metal 60. Preferably, the brazing metal substantially completely fills the gap.

The brazing metal should be nonreactive with the metals of the eyelet and peripheral wall of the spinner. The brazing metal should be also completely wetting to these metals so that a sufficient braze can be formed. In order to be useful in the brazing operation, the brazing metal should have a melting point below the melting points of the metals used to form the eyelet and peripheral wall. In addition, the brazing metal should have a melting point above the operating temperature of the spinner, e.g., above about 1,260° C.

Only a few brazing metals are available which possess all these characteristics. Preferably, the brazing metal is an athermal material selected from the group consisting of binary alloys, ternary alloys, and mixtures thereof. More preferably, the brazing metal is an alloy selected from the group consisting of palladium-gold-nickel alloys, palladium-nickel alloys, and mixtures thereof.

Figure 6:
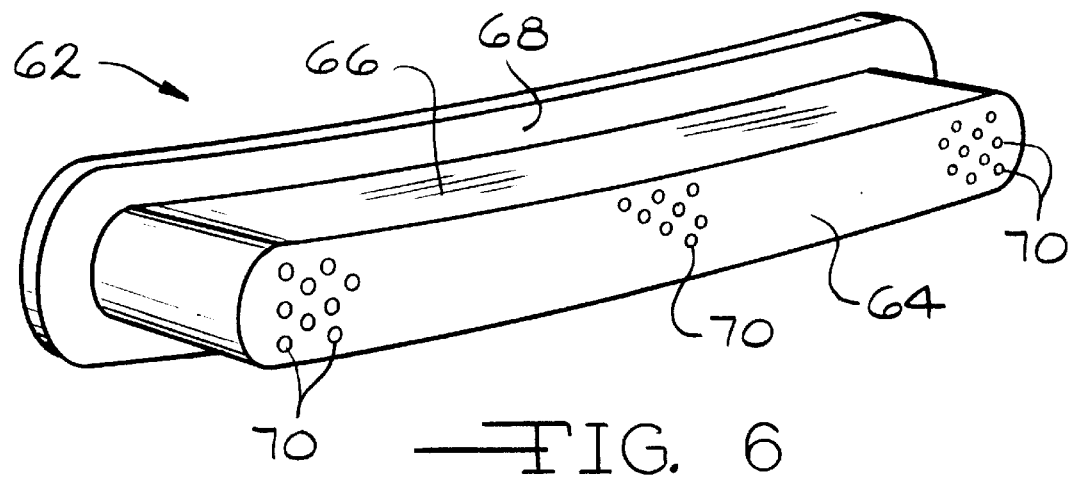
FIG. 6 is an enlarged perspective view of another alternate embodiment of an eyelet in accordance with the present invention.
Figure 7:
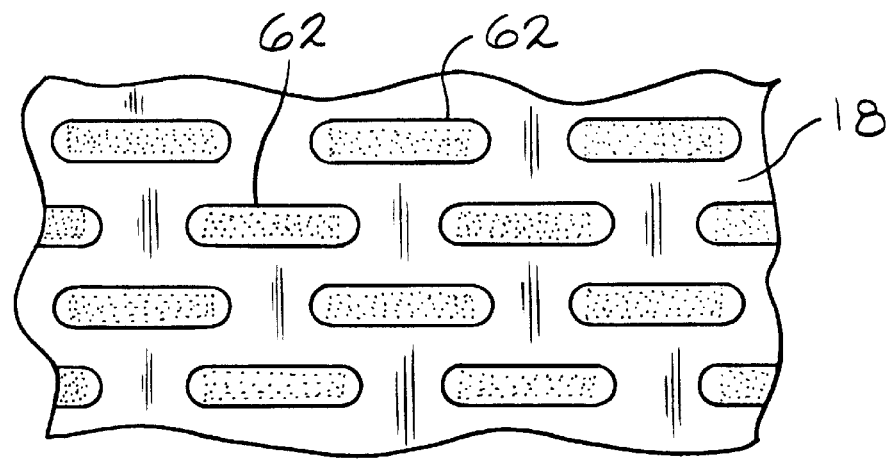
FIG. 7 is a side view of a portion of the peripheral wall of the spinner, showing a plurality of eyelets as in FIG. 6 mounted in the peripheral wall.

Another alternate embodiment of an eyelet 62 of the present invention is shown in FIG. 6. This embodiment of the eyelet has a generally rectangular shape instead of the generally cylindrical shape of the first embodiment of the eyelet. It is also generally larger than the first embodiment. Other shapes and sizes of eyelets can also be used in the invention. The eyelet 62 includes an eyelet face 64 having an elongated, generally rectangular shape with rounded ends. A generally rectangular portion 66 extends generally perpendicular from the edges of the eyelet face 64. A generally rectangular flange 68 extends outwardly from the edges of the rectangular portion 66. The eyelet face 64 has a relatively large number of orifices 70 formed therethrough (some of which are shown). Preferably, the eyelet face has from about 100 to about 1,000 orifices. FIG. 7 shows a plurality of eyelets 62 mounted in the peripheral wall 18 of the spinner. Preferably, the spinner includes from about 25 to about 250 of these eyelets. The eyelets are positioned in staggered rows in the peripheral wall to maximize the strength of the spinner.

It is envisioned that eyelets according to the present invention can also be constructed for making dual glass fibers.

The spinner 10 of the present invention is formed in a conventional manner. Then the apertures 26 can be machined or otherwise formed through the peripheral wall 18 of the spinner.

The eyelet of the present invention can be produced by a number of methods. In a preferred embodiment, the eyelet is produced by the well known deep drawing process. This process is described in detail in Metals Handbook, 9th Ed., Vol. 14, pp. 575–590 (1988). In general, deep drawing is a process in which a flat blank of metal is constrained while the central portion of the blank is pressed into a die opening to draw the metal into the desired shape. To produce the generally cylindrical eyelet 28 of the present invention, a generally circular, flat blank of precious metal is provided. The central portion of the blank is pressed into a generally cylindrical die by a punch. The blank is pressed into the die until the central portion abuts the circular bottom of the die. The central portion becomes the circular eyelet face of the eyelet. The portion of the blank drawn along the cylindrical surface of the die becomes the cylindrical portion of the eyelet. The perimeter portion of the blank is left outside the die and becomes the flange of the eyelet. A series of dies can also be used in the process.

The orifices are preferably pierced into the eyelet face during the final stages of the deep drawing process. Alternatively, the orifices can be formed through the eyelet after deep drawing by any conventional technique, such as twist drilling, laser drilling, or electron beam drilling.

It should be appreciated that, while a spinner of the present invention would be expected to cost significantly more to manufacture than conventional spinners, it is believed that the spinner will have significantly longer life than conventional spinners, as defined by the time that it takes the spinner eyelets or orifices to fail, corrode, creep, or otherwise degrade or change such that fiber properties are unacceptable. A 5 to 10 times longer life appears possible. In addition, because it is not expected that eyelets of the present invention will corrode to any significant extent it is expected that fiber diameter and other properties may remain relatively constant during a spinner's life. Therefore, it is believed that the dual effect of a longer-lived spinner and more constant fiber properties will more than offset the increased spinner manufacturing cost.

The principle and mode of operation of this invention have been described in its preferred embodiment. However, it should be noted that this invention may be practiced otherwise than as specifically illustrated and described without departing from its scope.

INDUSTRIAL APPLICABILITY

The invention can be useful in the production of mineral fibers such as glass fibers for use in thermal and acoustical insulation products, apparel products, filtration products, and as binders in composite materials.

We claim:

1. A spinner for centrifuging fibers from a molten material, the spinner comprising:

a generally annular peripheral wall having a plurality of apertures therethrough; and a plurality of eyelets, each eyelet mounted in each respective aperture, each eyelet having a peripheral wall defining a hollow channel leading to a surface, the surface defining multiple orifices therethrough, the channel in fluid communication with the orifices.

2. The spinner of claim 1 wherein the eyelets consist of a metal selected from the group consisting of platinum, rhodium, palladium, ruthenium, iridium, osmium, silver, gold, and alloys thereof.

3. The spinner of claim 1 wherein each of the eyelets includes a circumferential area supported by the peripheral wall, and wherein the surface comprises a central area unsupported by the peripheral wall, the orifices passing through the central area.

4. The spinner of claim 1 wherein the surface of each of the eyelets comprises an eyelet face oriented generally parallel to the peripheral wall and extending across the aperture, the eyelet face defining the orifices therethrough.

5. The spinner of claim 4 wherein each of the eyelets includes a generally cylindrical portion sized to fit within one of the apertures, the eyelet face of each of the eyelets being generally cylindrical and extending across a first end of the cylindrical portion, and a flange extending radially outward from a second end of the cylindrical portion.

6. The spinner of claim 4 wherein each of the eyelets includes a generally rectangular portion sized to fit within one of the apertures, a generally rectangular eyelet face extending across a first end of the rectangular portion, and a generally rectangular flange extending outwardly from a second end of the rectangular portion.

7. The spinner of claim 1 wherein the surface of each of the eyelets comprises an eyelet face defining the orifices therethrough, each eyelet face constructed to limit stress experienced at the eyelet face below about 34.5 MPa (megapascals) during operation of the spinner at a rotation rate in the range of 2,000–3,000 RPM.

8. The spinner of claim 1 wherein the surface of each of the eyelets comprises an eyelet face defining the orifices therethrough and that is generally circular, and wherein the eyelet face has a diameter to thickness ratio of not greater than about 30:1.

9. The spinner of claim 8 wherein the diameter to thickness ratio of each of the eyelet faces is not greater than about 20:1.

10. The spinner of claim 8 wherein each of the eyelet faces has a diameter within the range from about 3.81 mm to about 6.35 mm and a thickness within the range from about 0.25 mm to about 0.51 mm.

11. The spinner of claim 1 wherein the eyelets are mounted in the apertures by brazing with a brazing metal having a melting point below the melting points of the eyelet and peripheral wall and above about 1,260° C.

12. The spinner of claim 11 wherein the brazing metal is a material selected from the group consisting of binary alloys, ternary alloys, and mixtures thereof.

13. The spinner of claim 12 wherein the brazing metal is an alloy selected from the group consisting of palladium-gold-nickel alloys, palladium-nickel alloys, and mixtures thereof.

14. A spinner for centrifuging fibers from molten material, the spinner comprising:

a generally annular peripheral wall, the peripheral wall having a plurality of apertures formed therethrough, and a plurality of eyelets mounted in the apertures, each eyelet including a generally cylindrical portion sized to fit within an aperture, the cylindrical portion defining a hollow channel leading to a generally circular eyelet face extending across a first end of the cylindrical portion and oriented generally parallel to the peripheral wall, the eyelet face defining multiple orifices therethrough, the channel in fluid communication with the orifices, and a flange extending radially outward from a second end of the cylindrical portion, wherein the eyelets are formed of a metal selected from the group consisting of platinum, rhodium, palladium, ruthenium, iridium, osmium, silver, gold, and alloys thereof.

15. The spinner of claim 14 wherein the spinner includes from about 1,000 to about 5,000 eyelets.

16. The spinner of claim 14 wherein each of the eyelet faces defines therethrough from about 5 to about 50 of the orifices.

17. The spinner of claim 14 wherein each of said eyelet faces is generally flush with the peripheral wall.

* * * * *